Patented June 22, 1926.

1,589,840

UNITED STATES PATENT OFFICE.

ANTON CYRCZAK, OF GREEN BAY, WISCONSIN.

CLEANING COMPOUND.

No Drawing.   Application filed March 16, 1925.   Serial No. 16,064.

This invention relates to a cleaning compound and to the method of making such compound.

Objects of this invention are to provide a cleaning compound which may be made from relatively cheap ingredients in a cheap and easy manner, and which will not scratch or injure fine surfaces, but which will remove stains and produce a high polish.

Although the compound may be used for a great variety of purposes, it is particularly well adapted for the cleaning of automobiles which have surfaces having a high finish.

For making one gallon of the compound the following ingredients in substantially the proportions stated are employed: 5 pints of water, 4 ounces of oxalic acid, 8 drops of turpentine, ¼ ounce of magnesium oxide, 1 pint 12 fluid ounces of white vinegar, 1 pint of 20% ammonia.

In making this compound, the oxalic acid is thoroughly ground or powdered and is dissolved in hot water. The water is, however, kept below the boiling point. It is allowed to stand with occasional agitation to insure complete solution. Next, the magnesia is placed in cold water and is also allowed to stand with occasional agitation. After the two solutions have stood approximately twenty-four hours, they are mixed and the turpentine is added. The solution is again allowed to stand for twenty-four hours and means are provided whereby venting may occur to allow the escape of gas.

Thereafter, the solution is well shaken, and the vinegar is added and the solution is again agitated. The ammonia is then added and the entire solution is allowed to stand for another twenty-four hours.

It is intended that in making the oxalic acid and the magnesia solution that a pint of the water only is used. Thereafter, the remainder of the water is added to the solution.

In canning or bottling the solution, it is thoroughly stirred to insure complete mixing and a uniform product.

It will be seen that the compound may be very easily made from relatively cheap ingredients and has been found in actual trials to effectively clean and polish surfaces without injuring even the highly finished surfaces.

It is intended that after the cleaning compound has been used that water be applied to the surface. This may be easily done during the polishing operation, if desired.

It has been found from actual trials that the compound may be effectively used in cleaning straw hats, clothes and similar articles, as well as in cleaning metals and highly finished surfaces.

I claim:

A cleaning compound formed by mixing the following ingredients in substantially the proportions stated: 5 pints of water, 4 ounces of oxalic acid, 8 drops of turpentine, ¼ ounce of magnesia powder, 1 pint 12 ounces of white vinegar, 1 pint of 20% ammonia.

In testimony that I claim the foregoing I have hereunto set my hand at Green Bay, in the county of Brown and State of Wisconsin.

ANTON CYRCZAK.